United States Patent
Choi

(10) Patent No.: US 6,943,756 B1
(45) Date of Patent: Sep. 13, 2005

(54) DEVICE FOR ENHANCING CONTRAST IN LIQUID CRYSTAL DISPLAY PROJECTION SYSTEM

(75) Inventor: Jong-Chul Choi, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 595 days.

(21) Appl. No.: 09/628,168

(22) Filed: Jul. 28, 2000

(30) Foreign Application Priority Data

Jul. 29, 1999 (KR) .................................. 99-30995

(51) Int. Cl.[7] .......................................... G09G 3/00
(52) U.S. Cl. ........................... 345/32; 345/48; 345/50
(58) Field of Search .................... 345/32, 48, 50; 353/97; 348/766; 359/443; 349/5

(56) References Cited

U.S. PATENT DOCUMENTS

| | | | | |
|---|---|---|---|---|
| 3,724,938 A | * | 4/1973 | Nepela | 353/20 |
| 4,635,051 A | * | 1/1987 | Bos | 345/32 |
| 5,048,931 A | * | 9/1991 | Magocs | 349/5 |
| 5,181,117 A | * | 1/1993 | Choi et al. | 348/255 |
| 5,231,496 A | * | 7/1993 | Takui | 348/689 |
| 5,303,054 A | * | 4/1994 | Chen | 348/766 |
| 5,597,223 A | * | 1/1997 | Watanabe et al. | 353/97 |
| 5,622,418 A | * | 4/1997 | DAijogo et al. | 353/97 |
| 5,634,704 A | * | 6/1997 | Shikama et al. | 353/31 |
| 5,801,792 A | | 9/1998 | Smith et al. | 348/749 |
| 5,889,614 A | * | 3/1999 | Cobben et al. | 359/483 |
| 5,952,992 A | * | 9/1999 | Helms | 345/102 |
| 6,243,152 B1 | * | 6/2001 | Knox et al. | 349/86 |
| 6,327,093 B1 | * | 12/2001 | Nakanishi et al. | 359/634 |

FOREIGN PATENT DOCUMENTS

| | | | |
|---|---|---|---|
| JP | 62-54226 A | 3/1987 | |
| JP | 63-298221 A | 12/1988 | |
| JP | 04199123 A | * 11/1990 | ............ G02F 1/133 |
| JP | 5-188345 | 7/1993 | ............ G02F 1/13 |
| JP | 7-15692 A | 1/1995 | |
| JP | 7-168147 | 7/1995 | ............ G02F 1/13 |
| JP | 10-73797 | 3/1998 | ............ G02F 1/13 |
| KR | 0163077 | 9/1998 | ............ H04N 5/74 |

* cited by examiner

*Primary Examiner*—Guy Lamarre
*Assistant Examiner*—Fritz Alphonse
(74) *Attorney, Agent, or Firm*—Sughrue Mion, PLLC

(57) ABSTRACT

A device for enhancing contrast for a liquid crystal display (LCD) projection system is provided. The contrast enhancing device includes an image driver supplying an image signal, a LCD panel for converting the input image signal into an optical image signal, and a contrast control portion positioned on the same optical axis as that of the LCD panel, for controlling an amount of scanned light according to the brightness of a corresponding image. Accordingly, the projection system adopting an image display device as a liquid crystal device provides a remarkably enhanced contrast enhancement effect. In particular, as the brightness of the total image is brighter, the contrast enhancement effect becomes larger.

21 Claims, 2 Drawing Sheets

DEVICE FOR ENHANCING CONTRAST IN LIQUID CRYSTAL DISPLAY PROJECTION SYSTEM

BACKGROUND OF THE INVENTION

1. Field of the Invention

The present invention relates to a liquid crystal display (LCD) projection system, and more particularly, to a device for enhancing contrast of an image which is projected on a screen according to a result of comparing an average level of an image signal and a reference level.

2. Description of the Related Art

In general, a projection system adopting a liquid crystal display (LCD) scans an image signal which is supplied from an image driver and displayed on a LCD panel with light incident from an illumination optical system. Here, the scanned light is projected on the screen through a deflection plate and a projection lens, to thereby regenerate an enlarged image.

A conventional LCD projection system will be described with reference to FIG. 1.

The LCD projection system of FIG. 1 includes illumination optical system 10 through 14, an image driver 16, a LCD panel 15 and a projection optical system 17 through 19.

The illumination optical system includes an optical unit 10 for emitting and reflecting light, and a relay lens 11 for making an optical feature of the light emitted from the optical unit 10 and reducing an angle of divergence, by use of a total reflection feature. Also, the illumination optical system includes a collimating lens 12 for converting the light passed through the relay lens 11 into parallel light, a dichroic mirror 13 for separating the parallel light into three primary color signal components R, G and B and altering a light path, and a first polarizing plate 14 for polarizing each color signal component supplied from the dichroic mirror 13 to be incident to the LCD panel 15.

The image driver 16 performs a predetermined signal processing with respect to an image signal input from an image signal processor (not shown) to be displayed on the LCD panel 15, and converts the image signal into a driving control signal to be supplied to the LCD panel 15. Here, the image driver 16 further performs an ABL (auto brightness limiter) control function which is well known to a person skilled in the art. The ABL control function is to obtain an average level of an image signal to be displayed on the LCD panel 15, or an externally input image signal, so as to maintain the brightness of the image to be displayed on the LCD panel 15 consistently. Then, the average level is compared with a set reference level, and a gain of the image signal supplied to the LCD panel 15 is adjusted according to the comparison result. That is, if the obtained average level is higher than the reference level through the ABL control function, a low-level ABL control signal for decreasing the gain of the image signal supplied to the LCD panel 15 is applied to an amplifier (not shown). Meanwhile, if the former is lower than the latter, a high-level ABL control signal for increasing the gain of the image signal supplied to the LCD panel 15 is applied to the amplifier. The above control operation is linearly performed.

The LCD panel 15 displays a corresponding image thereon according to the driving control signal of the image signal supplied from the image driver 16 and scans the image according to the intensity of the illuminated light incident from the illumination optical system.

A second polarizing plate 17 disposed between the LCD panel 15 and a focusing lens 18 selectively transmits or blocks the light scanned from the LCD panel 15, according to the polarizing component of the light. The focusing lens 18 focuses the light transmitted through the second polarizing plate 17 and transfers the focused light to a projection lens 19. The projection lens 19 projects the light transferred from the focusing lens 18 onto a screen (not shown), to thereby enlarge the image regenerated on the screen.

However, in the case of the conventional LCD projection system, the contrast of the LCD panel itself on which the image signal is primarily displayed is much lower than that of a display device such as a cathode ray tube (CRT), and the polarizing plate disposed between the LCD panel and the projection lens does not block the light completely although the degree of polarization is 99.5% or more. Thus, since the black level of the image having passed through the LCD panel and the polarizing plate and regenerated on the screen does not become a perfect black level, the conventional LCD projection system has a problem in which the contrast of the regenerated image is greatly lowered.

SUMMARY OF THE INVENTION

To solve the above problems, it is an object of the present invention to provide a device for remarkably enhancing contrast of an image regenerated in a projection system in which a liquid crystal display (LCD) is used as an image display device.

To accomplish the above object of the present invention, there is provided a device for enhancing contrast for a liquid crystal display (LCD) projection system, the contrast enhancing device comprising: an image driver supplying an image signal; a LCD panel for converting the input image signal into an optical image signal; and a contrast control portion positioned on the same optical axis as that of the LCD panel, for controlling an amount of scanned light according to the brightness of a corresponding image.

BRIEF DESCRIPTION OF THE DRAWINGS

The above object and other advantages of the present invention will become more apparent by describing the preferred embodiment thereof in more detail with reference to the accompanying drawings in which.

DETAILED DESCRIPTION OF THE INVENTION

A LCD projection system according to a preferred embodiment of the present invention will be described in detail with reference to FIG. 2.

Figure 1:
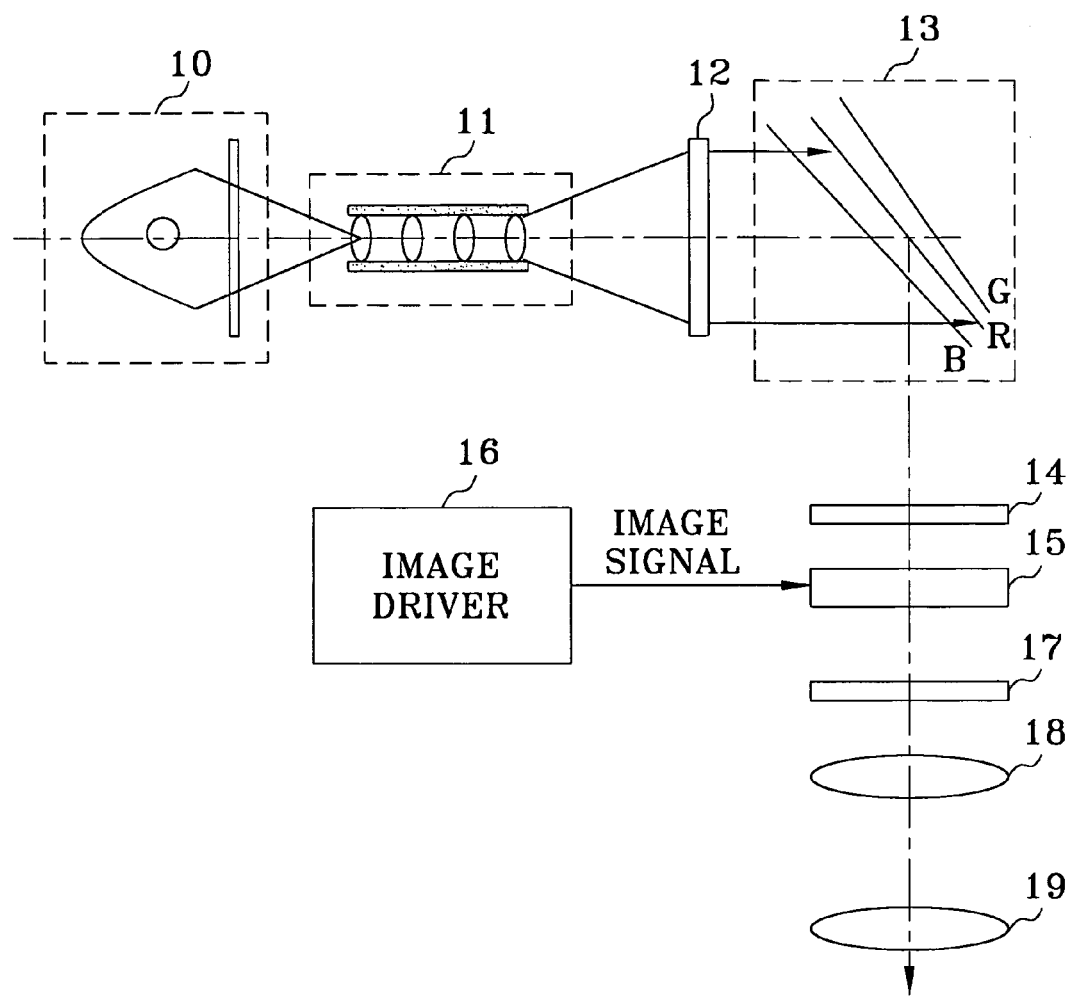
FIG. 1 shows a conventional LCD projection system.
Figure 2:
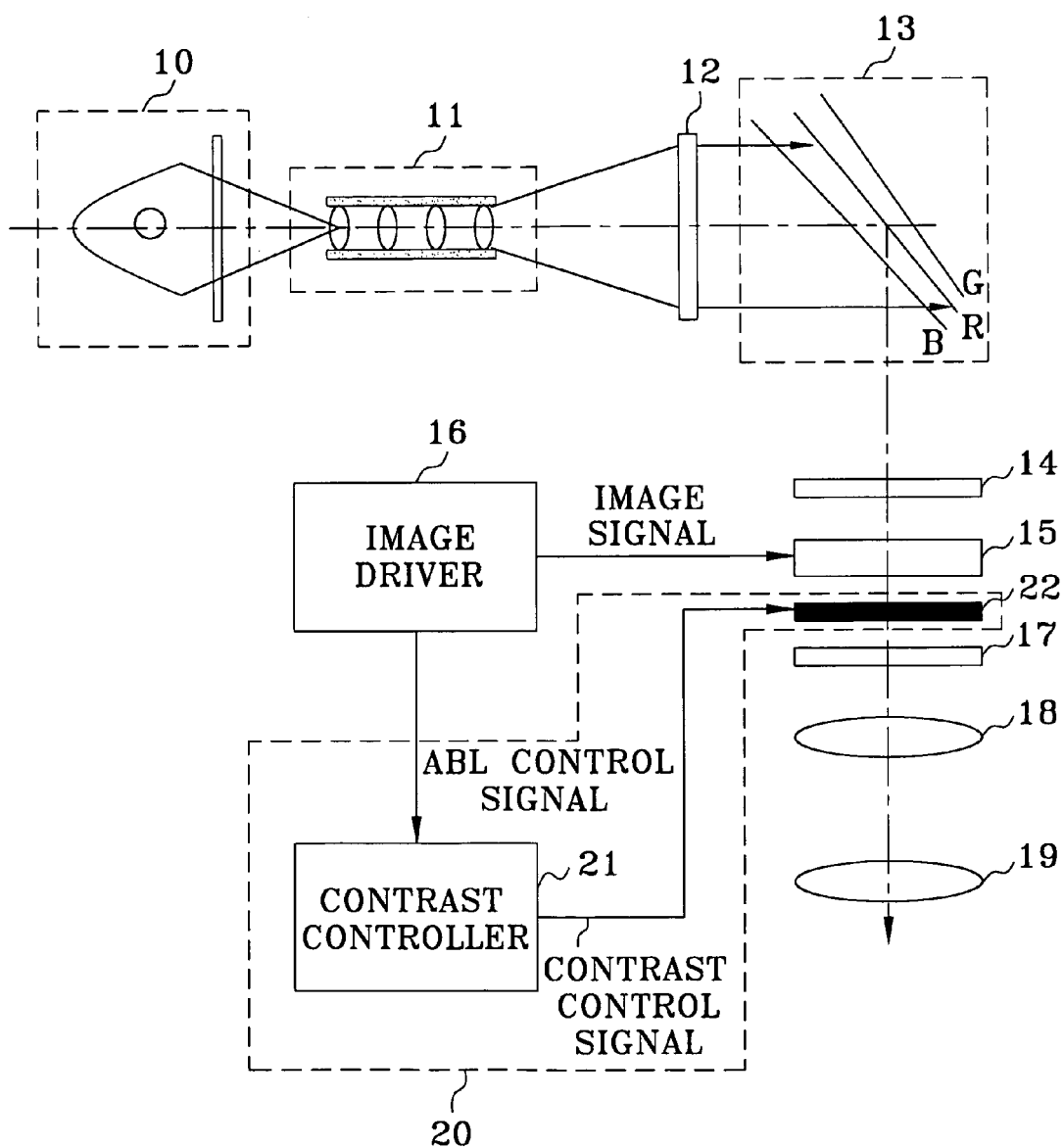
FIG. 2 shows a LCD projection system for explaining an embodiment of the present invention.

The LCD projection system of FIG. 2 includes illumination optical system 10 through 14, an image driver 16, a LCD panel 15 and a projection optical system 17 through 19, as basic elements. A contrast control portion 20 according to a technological concept of the present invention is functionally combined with the above elements.

The contrast control portion 20 includes a contrast controller 21 and contrast control plate 22. The contrast control plate 22 is disposed between the LCD panel 15 and the second polarizing plate 17. The contrast control plate 22 is opened or closed according to the level of an applied contrast control signal, to thereby control an amount of light of an image scanned from the LCD panel 15, or a light intensity to be transferred to the second polarizing plate 17.

It is preferable that the contrast control plate 22 is implemented as a liquid crystal display (LCD), and controls the degree of the opening and closing of cells constituting the LCD according to the level of the applied contrast control signal. Here, in the case that the contrast control signal is a high-level analog signal, the cell of the contrast control plate 22 is opened properly to transmit the light having passed through the LCD panel 15. Meanwhile, in the case that the contrast control signal is a low-level analog signal, the cell of the contrast control plate 22 is closed properly to block the light having passed through the LCD panel 15.

The contrast controller 21 applies the contrast control signal to the contrast control plate 22, in which the contrast control signal controls the above-described optical cell to be closed in correspondence to a difference value if the average level of the image signal is lower than the reference level, or controls the above-described optical cell to be opened in correspondence to a difference value if the average level of the image signal is higher than the reference level. Here, it is preferable that the contrast controller 21 receives the above-described ABL control signal generated from the image driver 16 and applies a contrast control signal which is inversely proportional to the level of the ABL control signal, to the contrast control plate 22.

Thus, in the case that the applied ABL control signal is a high-level signal, the contrast controller 21 applies a low-level contrast control signal which is inversely proportional to the level of the ABL control signal to the contrast control plate 22. As a result, the cell of the contrast control plate 22 is controlled to be in the closed state by a value corresponding to the low-level contrast control signal. Thus, the light which has become bright in the total image on the LCD panel 15 is properly blocked by the ABL control signal, to thereby enhance the contrast greatly. Reversely, in the case that the applied ABL control signal is a low-level signal, the contrast controller 21 applies a high-level contrast control signal which is inversely proportional to the level of the ABL control signal to the contrast control plate 22. As a result, the cell of the contrast control plate 22 is controlled to be in the opened state by a value corresponding to the high-level contrast control signal. Thus, the light which has become dark in the total image on the LCD panel 15 is properly transmitted by the ABL control signal, to thereby maintain the contrast.

In particular, the second polarizing plate 17 cannot block the light corresponding to the black level of the image alone, but the contrast control plate 22 is used together with the second polarizing plate 17 to play a role of perfectly blocking the light corresponding to the black level, to thereby remarkably enhance the contrast of the image.

The LCD projection system according to the present invention uses the contrast control plate which is controlled based on the result of comparing the average level of the image signal to be displayed with the reference level, to thereby prevent the lowering of the contrast of the image due to the characteristic of the LCD panel itself. In particular, the present invention employs the contrast control plate which is controlled based on the ABL control signal, to thereby further enhance the contrast as the brightness of the total image becomes higher.

What is claimed is:

1. A device for enhancing contrast for a liquid crystal display (LCD) projection system, the contrast enhancing device comprising:
    an image driver supplying an image signal;
    an LCD panel for converting the image signal into an optical image signal; and
    a contrast control portion positioned on the same optical axis as that of the LCD panel, for controlling the contrast of scanned light according to an average level of the image signal.

2. The contrast enhancing device of claim 1, wherein said image driver comprises an auto brightness limiter (ABL) function.

3. The contrast enhancing device of claim 2, wherein said contrast control portion comprises:
    a contrast control plate for controlling an amount of light scanned from said LCD panel; and
    a contrast controller for generating a contrast control signal for controlling the degree of the opening and closing of said contrast control plate according to an ABL control signal.

4. The contrast enhancing device of claim 3, wherein said contrast controller applies the contrast control signal which is inversely proportional to the ABL control signal supplied from said image driver.

5. The contrast enhancing device of claim 3, wherein said contrast control plate is an LCD.

6. The contrast enhancing device of claim 5, wherein said contrast control plate controls the degree of the opening and closing of cells comprising the LCD according to the contrast control signal applied from said contrast controller.

7. The contrast enhancing device of claim 3, wherein said contrast controller applies the contrast control signal for controlling said contrast control plate to be closed in correspondence to a difference value if the average level of the image signal is lower that a reference level, or controlling said contrast control plate to be opened in correspondence to a difference value if the average level of the image signal is higher than the reference level.

8. The projection system of claim 3, wherein said contrast control plate is opened if an average level of the image signal is higher than a reference level.

9. The contrast enhancing device of claim 1, further comprising a polarizing plate for selectively transmitting the light scanned from said LCD panel according to the polarization component of the light, wherein said contrast control portion is disposed on an optical path between said LCD panel and said polarizing plate.

10. A liquid crystal display projection system, the projection system comprising:
    an image driver supplying an image signal and a brightness control signal;
    a liquid crystal display panel for converting the image signal into an optical image signal; and
    a contrast controller that controls the contrast of the optical image signal according to the brightness of the image signal, wherein the contrast controller applies a contrast control signal that is inversely proportional to the brightness control signal.

11. The projection system of claim 10, wherein said contrast controller comprises:
    a control plate for controlling the contrast of the optical image signal output from said liquid crystal display panel; and
    a controller for generating the contrast control signal for controlling said control plate according to the brightness control signal.

12. The projection system of claim 11, wherein said control plate is a liquid crystal device.

13. The projection system of claim 12, wherein said contrast control signal controls the opening and closing of cells comprising the control plate.

14. The projection system of claim 13, wherein said control plate is closed if an average level of the image signal is lower than a reference level.

15. The projection system of claim 13, wherein said control plate is opened if an average level of the image signal is higher than a reference level.

16. The projection system of claim 10, further comprising a polarizing plate for selectively transmitting light output from said liquid crystal device panel according to a polarization component of the light, wherein said contrast controller is disposed on an optical path between said liquid crystal device panel and said polarizing plate.

17. A liquid crystal display projection system, the projection system comprising:
   an image driver supplying an image signal;
   a liquid crystal display panel for converting the image signal into an optical image signal;
   a contrast control portion that controls the contrast of the optical image signal according to an average level of the image signal; and
   a polarizing plate for selectively transmitting light output from said liquid crystal device panel according to a polarization component of the light wherein said contrast control portion is disposed on an optical path between said liquid crystal device panel and said polarizing plate.

18. The projection system of claim 17, wherein said image driver comprises an auto brightness limiter function.

19. The projection system of claim 18, wherein said contrast control portion comprises:
   a contrast control plate for controlling the contrast of the optical image signal output from said liquid crystal display panel; and
   a contrast controller for generating a contrast control signal to control said contrast control plate according to a control signal output by the auto brightness limiter function.

20. The projection system of claim 19, wherein said contrast control signal is inversely proportional to the control signal output by the auto brightness limiter function.

21. The projection system of claim 19, wherein said contrast control signal controls the opening and closing of cells comprising the contrast control plate.

* * * * *